(12) United States Patent
Foix

(10) Patent No.: US 12,168,567 B2
(45) Date of Patent: Dec. 17, 2024

(54) TANK COMPRISING A CAPTURE DEVICE OPERATING INDEPENDENTLY OF THE INCLINATION OF THE TANK, AIRCRAFT COMPRISING AT LEAST ONE SUCH TANK

(71) Applicant: Airbus Operations SAS, Toulouse (FR)

(72) Inventor: Vincent Foix, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 54 days.

(21) Appl. No.: 18/311,310

(22) Filed: May 3, 2023

(65) Prior Publication Data

US 2023/0356926 A1 Nov. 9, 2023

(30) Foreign Application Priority Data

May 5, 2022 (FR) ........................................ 2204283

(51) Int. Cl.
*B65D 88/54* (2006.01)
*B64D 37/04* (2006.01)

(52) U.S. Cl.
CPC ............. *B65D 88/54* (2013.01); *B64D 37/04* (2013.01)

(58) Field of Classification Search
CPC .... B60K 15/0406; B65D 88/54; B64D 37/04; B64D 37/02; B64G 1/402
USPC ............. 220/562; 244/172.3, 172.2, 4 A, 61, 244/135 R
See application file for complete search history.

(56) References Cited

U.S. PATENT DOCUMENTS

| | | | | |
|---|---|---|---|---|
| 1,363,263 A | * | 12/1920 | Ohliger | H01M 50/636 |
| | | | | 429/85 |
| 3,979,005 A | | 9/1976 | Robinson | |
| 5,687,778 A | * | 11/1997 | Harris | B67D 7/3227 |
| | | | | 141/59 |
| 2005/0166967 A1 | | 8/2005 | Howe | |

FOREIGN PATENT DOCUMENTS

| | | |
|---|---|---|
| GB | 755624 A | 8/1956 |
| KR | 20060064914 A | 6/2006 |

OTHER PUBLICATIONS

French Search Report for French Patent Application No. 2204283 dated Nov. 30, 2022; priority document.

* cited by examiner

*Primary Examiner* — Robert J Hicks
(74) *Attorney, Agent, or Firm* — Greer, Burns & Crain, Ltd.

(57) ABSTRACT

A tank configured to store a liquid and that includes at least one capture device which includes at least a first portion of a line situated at the bottom of the tank, close to its first end, and at least a second portion of the line situated at the bottom of the tank, close to its second end, each of the first and second portions including at least one orifice situated on the upper face thereof, a floating shut-off device for each orifice, the floating shut-off device being movable between an open position in which the floating shut-off device is spaced apart from the orifice and a closed position in which the floating shut-off device shuts off the orifice, the floating shut-off device having a density lower than that of the liquid stored in the tank.

9 Claims, 2 Drawing Sheets

TANK COMPRISING A CAPTURE DEVICE OPERATING INDEPENDENTLY OF THE INCLINATION OF THE TANK, AIRCRAFT COMPRISING AT LEAST ONE SUCH TANK

CROSS-REFERENCES TO RELATED APPLICATIONS

This application claims the benefit of the French patent application No. 2204283 filed on May 5, 2022, the entire disclosures of which are incorporated herein by way of reference.

FIELD OF THE INVENTION

The present application relates to a tank comprising a capture device operating independently of the inclination of the tank, and also to an aircraft comprising at least one such tank.

BACKGROUND OF THE INVENTION

As illustrated in FIG. 1, an aircraft 10 comprises a fuselage 12 which extends along a longitudinal axis AL between a nose cone 12.1 and a tail cone 12.2. Depending on the phases of flight, the aircraft 10 may be inclined toward the rear (its tail cone 12.2 being lower than its nose cone 12.1), notably during a takeoff phase, or it may be inclined toward the front (its nose cone 12.1 being lower than its tail cone 12.2), notably during a descent phase.

According to one configuration, the aircraft 10 comprises at least one double-walled tank 14 for storing liquid hydrogen, for example. This tank 14 comprises a cylindrical body 16 which extends between first and second ends 16.1, 16.2 that are closed by end walls 18.1, 18.2 in the form of a dome. According to one arrangement, the cylindrical body 16 has an axis of revolution A16 substantially parallel to the longitudinal axis AL, the first end 16.1 being oriented toward the front of the aircraft and the second end 16.2 toward the rear.

The aircraft 10 also comprises a fuel circuit comprising a capture device, positioned in the tank 14, making it possible to capture the fuel in order to bring it out of the tank 14. According to one embodiment, this capture device comprises a line, an end of which opens out at or in the vicinity of the bottom of the tank 14.

In the case of a tank positioned in an aircraft, the low point of the tank is not always situated at the same location depending on the phase of flight. Thus, the low point of the tank 14 is situated at the first end 16.1 of the tank 14 when the aircraft 10 is inclined toward the front or is situated at the second end 16.2 when the aircraft is inclined toward the rear.

Irrespective of its positioning, the capture device does not allow optimal emptying of the tank to be obtained. Thus, it is necessary to provide an additional volume of fuel in the tank, which is not used but is necessary in order to ensure that the capture device is always immersed, irrespective of the inclination of the aircraft, when the quantity of fuel in the tank is low and the level of fuel in the tank is low.

The present invention seeks to remedy all or some of the drawbacks of the prior art.

To that end, a subject of the invention is a tank configured to store a liquid, comprising:
at least one chamber comprising a bottom which extends between first and second ends,
at least one capture device comprising at least one line positioned on the bottom or in the vicinity thereof, each line having a lower face oriented toward the bottom of the chamber and an upper face opposite to the lower face. Vicinity here meaning within the lower half of the tank, preferably within the lower 25% of the tank, and more preferably, within the lower 10% of the tank.

According to the invention, the capture device comprises at least a first portion of line in the vicinity of the first end and at least a second portion of line in the vicinity of the second end, each of the first and second portions comprising at least one orifice situated on the upper face of the line. In addition, the capture device comprises, for each orifice, a floating shut-off device that is movable between an open position in which the floating shut-off device is spaced apart from the orifice and a closed position in which the floating shut-off device shuts off the orifice, the floating shut-off device having a density lower than that of the liquid stored in the tank. Vicinity here meaning closer to the respective end of the tank than to the opposite end of the tank, preferably within the last 25% of the tank towards the respective end, and most preferably within the last 10% of the tank towards the respective end.

This solution makes it possible to optimize the emptying of the tank. Irrespective of the inclination of the tank, there is always at least one immersed orifice via which the liquid can be captured in order to extract it from the tank even when the level of the liquid in the tank is low.

According to another feature, the capture device comprises, for each floating shut-off device, a pivoting support which has a first end connected to the line or to the chamber by a first pivoting connection and a second end connected to the floating shut-off device.

According to another feature, each line comprising a median plane separating the lower and upper faces, the first pivoting connection connects the pivoting support and the line and comprises a first pivot axis that is substantially perpendicular to the axis of the line and that is contained in the median plane or in a plane parallel to the median plane.

According to another feature, each pivoting support comprises two branches that are parallel to one another and positioned on either side of the line and of the floating shut-off device and that are configured to pivot in planes perpendicular to the first pivot axis, each of the branches connecting the line and the floating shut-off device.

According to another feature, for each first portion situated in the vicinity of the first end and for each pair comprising an orifice and a floating shut-off device, the first pivot axis of the pivoting support of the floating shut-off device is closer to the first end than the orifice. In addition, for each second portion situated in the vicinity of the second end and for each pair comprising an orifice and a floating shut-off device, the first pivot axis of the pivoting support of the floating shut-off device is closer to the second end than the orifice.

According to another feature, each floating shut-off device is a sphere, each orifice being substantially circular.

According to another feature, the first portion describes a trajectory in the shape of a U having a base oriented toward the first end, the second portion describing a trajectory in the shape of a U having a base oriented toward the second end.

According to another feature, each capture device comprises a line comprising, in series, a first part exiting the chamber, the first U-shaped portion positioned in the vicinity of the first end of the chamber, a rectilinear intermediate portion and the second U-shaped portion positioned in the vicinity of the second end.

A further subject of the invention is an aircraft comprising at least one tank according to one of the preceding features.

BRIEF DESCRIPTION OF THE DRAWINGS

Other features and advantages will become apparent from the following description of the invention, which description is given solely by way of example, with reference to the appended drawings, in which.

DETAILED DESCRIPTION OF THE PREFERRED EMBODIMENTS

Figure 1:
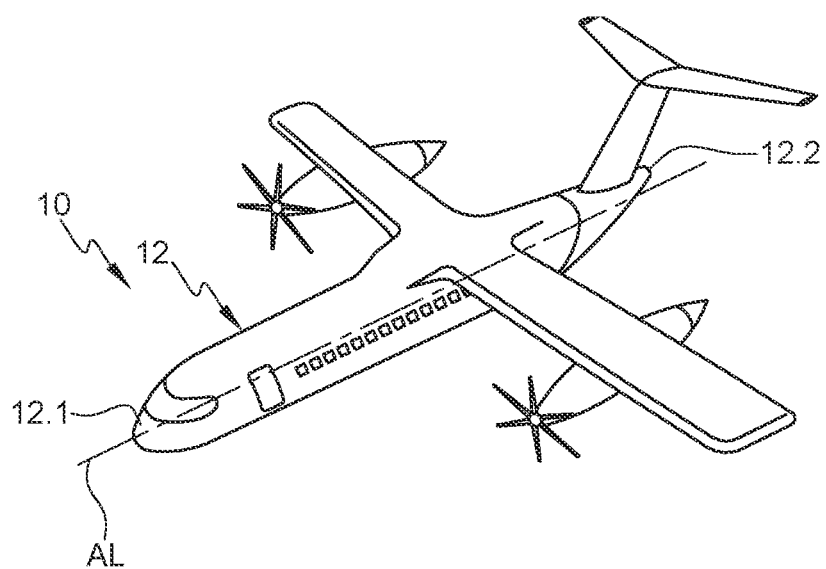
FIG. 1 is a perspective view of an aircraft.
Figure 2:
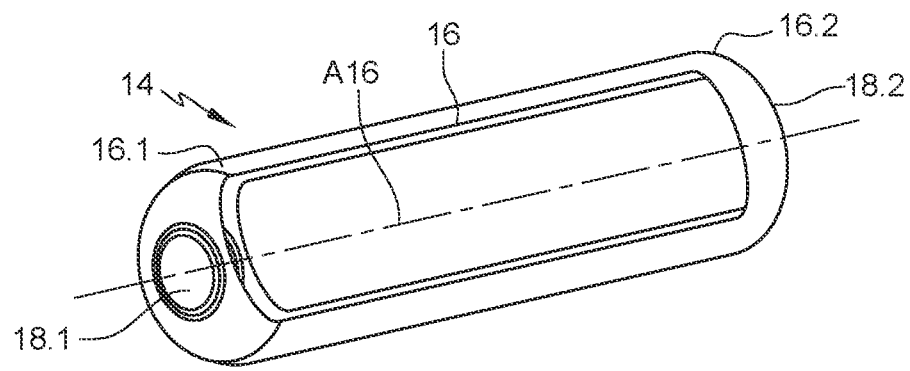
FIG. 2 is a perspective view of a double-walled tank.
Figure 3:
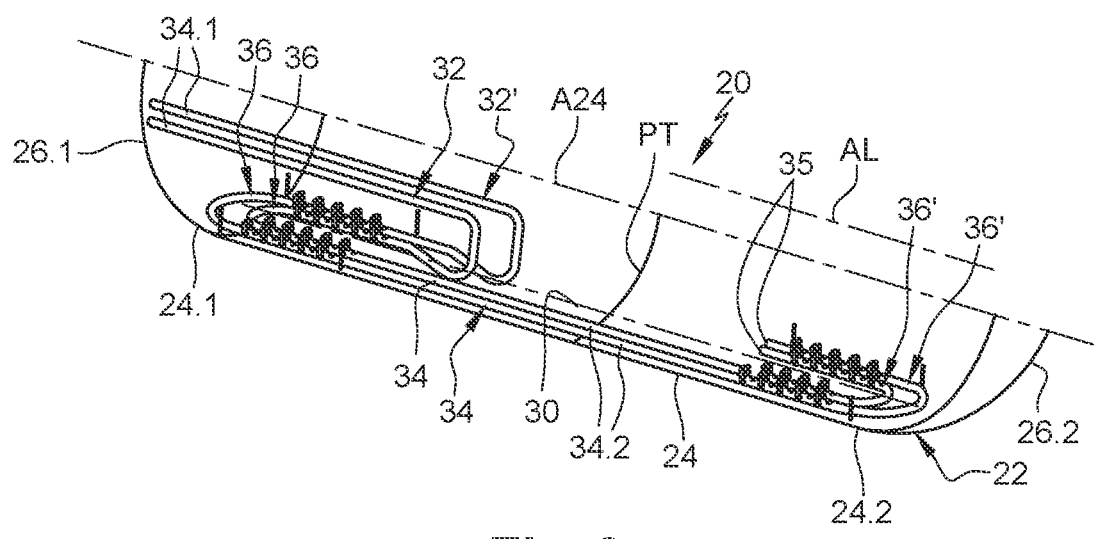
FIG. 3 is a perspective view of an inner part of a tank equipped with a capture device, illustrating one embodiment of the invention.

According to one embodiment visible in FIG. 3, a tank 20 comprises at least one chamber 22 which comprises a cylindrical body 24 extending between first and second ends 24.1, 24.2, and end walls 26.1, 26.2 that are configured to close the first and second ends 24.1, 24.2 of the cylindrical body 24. The cylindrical body 24 has an axis of revolution A24.

According to one application, an aircraft comprises at least one tank 20 positioned in such a way that its axis of revolution A24 is parallel to the longitudinal axis AL and configured to store hydrogen in the liquid state. During operation, the tank 20 may be inclined toward the front or toward the rear depending on the phases of flight.

Of course, the invention is not limited to this application. Irrespective of the embodiment, the tank 20 is configured to store a liquid 28 (visible in FIGS. 7 and 8) and comprises at least one chamber 22 comprising a bottom 30 which extends between the first and second ends 24.1, 24.2 that are oriented in a first direction. The liquid 28 has a surface F28, visible in FIG. 8, corresponding to the interface between the liquid 28 and the gas situated above the liquid 28. During operation, the tank 20 may tilt in a vertical tilting plane passing through the first direction about a tilting axis that is substantially perpendicular to the tilting plane.

The chamber 22 comprises a transverse median plane PT that is perpendicular to the axis of revolution A24 and that is positioned equidistantly from the first and second ends 24.1, 24.2.

The tank 20 comprises at least one capture device 32 allowing the liquid 28 present in the tank 20 to be captured in order to bring it out of the chamber 22.

Figure 4:
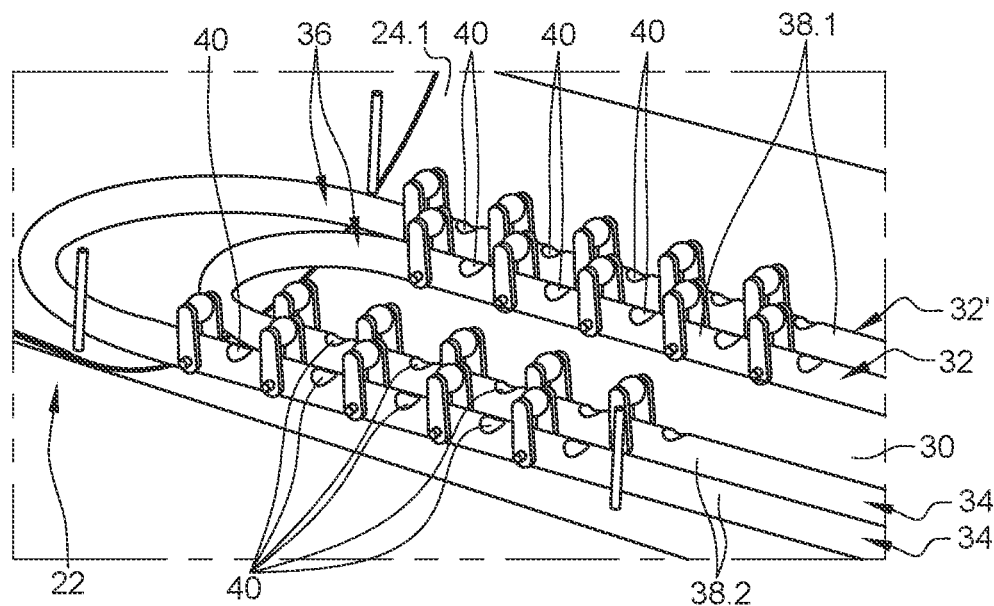
FIG. 4 is a perspective view of a part of a capture device.

According to one configuration visible in FIGS. 3 and 4, the tank 20 comprises two capture devices 32, 32'.

Each capture device 32, 32' comprises at least one line 34 which is positioned on the bottom 30 or very close thereto and which has at least one portion 36 positioned in the vicinity of the first or second end 24.1, 24.2. Each line 34 has a first, shut-off end 35 situated in the chamber 22, at the bottom 30, and a second end situated outside the chamber 22.

According to a first configuration that is not shown, the capture device 32, 32' comprises two lines 34, a first line comprising a portion positioned in the vicinity of the first end 24.1 and a second line comprising a portion positioned in the vicinity of the second end 24.2.

According to a second configuration visible in FIG. 3, the capture device 32, 32' comprises a first portion 36 in the vicinity of the first end 24.1 and a second portion 36' in the vicinity of the second end 24.2, the first and second portions 36, 36' being disposed in series.

According to one arrangement, each portion 36, 36' describes a U-shaped trajectory comprising first and second branches 38.1, 38.2 that are substantially parallel to one another.

According to one embodiment, each capture device 32, 32' comprises a line 34 comprising, in series, a first part 34.1 exiting the chamber 22, a first U-shaped portion 36 which is positioned in the vicinity of a first end 24.1 of the chamber 22 and the base of the U of which is oriented toward the first end 24.1, a rectilinear intermediate portion 34.2 and a second U-shaped portion 36' which is positioned in the vicinity of a second end 24.2 of the chamber 22 and the base of the U of which is oriented toward the second end 24.2.

Of course, the invention is not limited to this arrangement. Irrespective of the configuration, the capture device 32, 32' comprises at least a first portion 36 of line 34 in the vicinity of the first end 24.1 and at least a second portion 36' of line 34 in the vicinity of the second end 24.2.

For each portion 36, 36', the line 34 comprises a lower face 34I oriented downward toward the bottom 30 of the chamber 22 and an upper face 34S opposite to the lower face 34I and oriented upward, the lower and upper faces 34I, 34S being separated by a median plane PM. According to one configuration, the median plane PM is perpendicular to the tilting plane.

Each of the first and second portions 36, 36' of line 34 comprises a substantially circular orifice 40 situated on the upper face 34S of the line 34. According to one configuration, each branch 38.1, 38.2 of each portion 36, 36' of each line 34 comprises a plurality of orifices 40 that are spaced apart in a regular manner.

Figure 5:
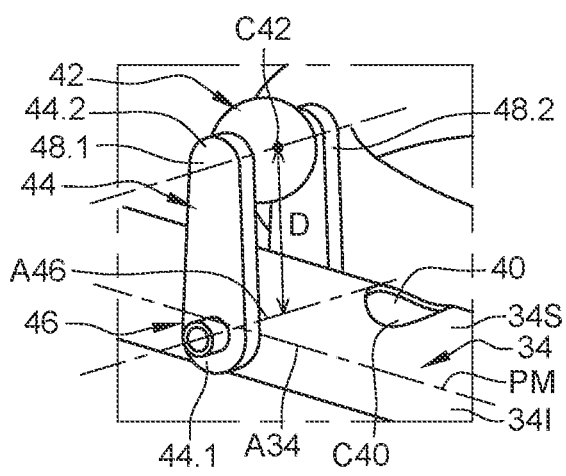
FIG. 5 is a perspective view of an orifice and of a floating shut-off device in an open position, illustrating one embodiment of the invention.
Figure 6:
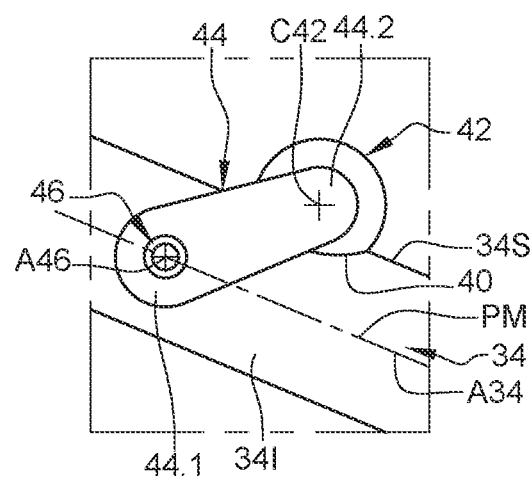
FIG. 6 is a side view of an orifice and of a floating shut-off device in a closed position, illustrating one embodiment of the invention.

The capture device 32 comprises, for each orifice 40, a floating shut-off device 42 that is movable between an open position, visible in FIG. 5, in which the floating shut-off device 42 is spaced apart from the orifice 40 and a closed position, visible in FIG. 6, in which the floating shut-off device 42 shuts off the orifice 40. The floating shut-off device 42 has a density lower than that of the liquid 28.

According to one embodiment, the floating shut-off device 42 has a spherical shape which has a diameter greater than that of the orifice 40.

The orifice 40 and the floating shut-off device 42 are not limited to these geometries. Irrespective of the embodiment, the orifice 40 and the floating shut-off device 42 are configured such that, in a closed position, the floating shut-off device 42 plugs the orifice 40 and prevents a flow of a fluid between the interior and the exterior of the line 34. When the floating shut-off device 42 plugs the orifice 40, this also makes it possible to avoid unpriming of a pump used to pump the liquid 28 in the tank 20.

For each floating shut-off device 42, the capture device 32 comprises a pivoting support 44 which has a first end 44.1 connected to the line 34 by a first pivoting connection 46 and a second end 44.2 connected to the floating shut-off device 42. In line with the first pivoting connection 46, the substantially cylindrical line 34 has a line axis A34. The first pivoting connection 46 comprises a first pivot axis A46 that is contained in the median plane PM or in a plane parallel to the median plane PM and that is substantially perpendicular to the line axis A34.

According to another embodiment, the first pivoting connection 46 connects the floating shut-off device 42 and the chamber 22.

According to one configuration, the second end 44.2 and the floating shut-off device 42 are connected by a second pivoting connection which has a second pivot axis substantially parallel to the first pivot axis A46. In a variant, the second end 44.2 and the floating shut-off device 42 are connected by a rigid connection or any other connection.

According to a non-limiting embodiment, each pivoting support 44 comprises two branches 48.1, 48.2 that are parallel to one another and positioned on either side of the line 34 and of the floating shut-off device 42 and that are configured to pivot in planes perpendicular to the first pivot axis A46, each of the branches 48.1, 48.2 connecting the line 34 and the floating shut-off device 42. According to one embodiment, each branch 48.1, 48.2 is cut out of a plate.

In a variant, a pivoting support 44 may comprise a single pivoting branch positioned on a single side of the floating shut-off device 42.

According to one arrangement, for a given floating shut-off device 42, its center C42 and the first pivot axis A46 of the pivoting support 44 of the shut-off device 42 are separated by a distance D substantially equal to a distance separating the first pivot axis A46 from the center C40 of the orifice 40 associated with the floating shut-off device 42.

For each pair comprising an orifice 40 and a floating shut-off device 42, the first pivot axis A46 of the pivoting support 44 of the floating shut-off device 42 is separated from the transverse median plane PT by a distance greater than that separating the orifice 40 from the transverse median plane PT.

Thus, for each first portion 36 situated in the vicinity of the first end 24.1 and for each pair comprising an orifice 40 and a floating shut-off device 42, the first pivot axis A46 of the pivoting support 44 of the floating shut-off device 42 is closer to the first end 24.1 than the orifice 40, as illustrated in FIGS. 4 to 6. For each second portion 36' situated in the vicinity of the second end 24.2 and for each pair comprising an orifice 40 and a floating shut-off device 42, the first pivot axis A46 of the pivoting support 44 of the floating shut-off device 42 is closer to the second end 24.2 than the orifice 40, as illustrated in FIG. 7.

The operating principle of the capture device 32, 32' is as follows:

When the floating shut-off devices 42 are immersed, they are in an open position and the liquid 28 present in the chamber 22 is captured via the orifices 40 of the line 34.

Figure 7:
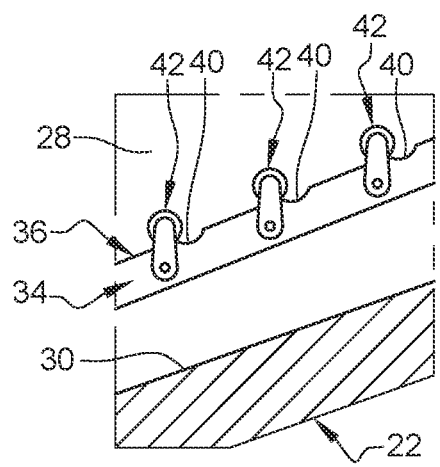
FIG. 7 is a side view of a first part of a capture device when the tank is inclined in a first direction, illustrating one embodiment of the invention.
Figure 8:
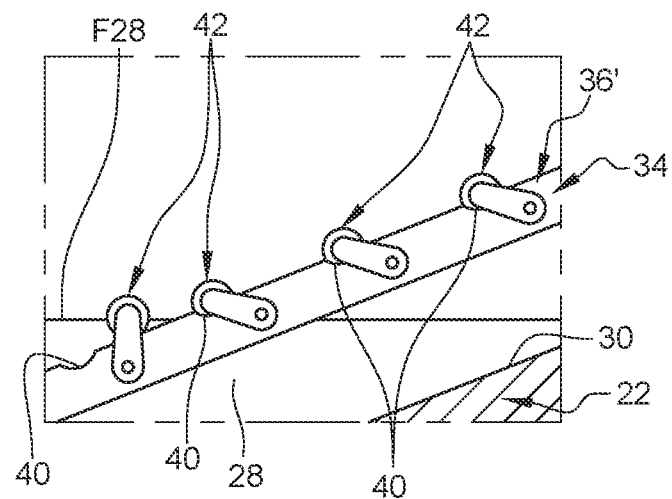
FIG. 8 is a side view of a second part of a capture device when the tank is inclined in the first direction, illustrating one embodiment of the invention.

When the tank 20 tilts in a first direction and the first end 24.1 is lower than the second end 24.2 as illustrated in FIGS. 7 and 8, the floating shut-off devices 42 situated at the first portion 36 are still immersed and in an open position, as illustrated in FIG. 7. At the second portion 36' situated in the vicinity of the second end 24.2, some floating shut-off devices 42 are still immersed and in an open position while other floating shut-off devices 42, outside of the liquid 28, pivot until they shut off the corresponding orifices 40, as illustrated in FIG. 8. Thus, the liquid 28 present in the chamber 22 is extracted via the orifices 40 of the first portion 36 of the line 34 and via those orifices 40 of the second portion 36' for which the floating shut-off devices 42 are immersed and in an open position.

When the tank 20 tilts in a second direction and the second end 24.2 is lower than the first end 24.1, the floating shut-off devices 42 situated at the second portion 36' are still immersed and in an open position. At the first portion 36 situated in the vicinity of the first end, some floating shut-off devices 42 are still immersed and in an open position while other floating shut-off devices 42, outside of the liquid 28, pivot until they shut off the corresponding orifices 40. Thus, the liquid 28 present in the chamber 22 is extracted via the orifices 40 of the second portion 36' of the line 34 and via those orifices 40 of the first portion 36 for which the floating shut-off devices 42 are immersed and in an open position.

Irrespective of the inclination of the tank 20, there is always at least one immersed orifice 40 via which the liquid 28 can be captured in order to extract it from the tank 20 even when the quantity of liquid in the tank is low and the level F28 of the liquid in the tank 20 is low. The orifices 40 that are situated outside of the liquid 28 are automatically closed by the floating shut-off devices 42.

This solution makes it possible to optimize the emptying of the tank 20 such that it is not necessary to provide an additional volume of liquid in order to ensure that an orifice of the capture device is always immersed irrespective of the inclination of the tank 20.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tank configured to store a liquid, comprising:
   at least one chamber comprising a bottom which extends between first and second ends,
   at least one capture device comprising at least one line positioned on the bottom or in a vicinity thereof, each line having a lower face oriented toward the bottom of the chamber and an upper face opposite to the lower face,
   wherein the capture device comprises at least a first portion of the line in a vicinity of the first end and at least a second portion of line in a vicinity of the second end, each of the first and second portions comprising at least one orifice situated on the upper face of the line, and
   wherein the capture device comprises, for each orifice, a floating shut-off device that is movable between an open position in which the floating shut-off device is spaced apart from the orifice and a closed position in which the floating shut-off device shuts off the orifice, the floating shut-off device having a density lower than that of the liquid stored in the tank.

2. The tank as claimed in claim 1, wherein the capture device comprises, for each floating shut-off device, a pivoting support which has a first end connected to the line or to the chamber by a first pivoting connection and a second end connected to the floating shut-off device.

3. The tank as claimed in claim 2,
wherein each line comprises a median plane separating the lower and upper faces, and
wherein the first pivoting connection connects the pivoting support and the line and comprises a first pivot axis that is substantially perpendicular to the axis of the line and that is contained in the median plane or in a plane parallel to the median plane.

4. The tank as claimed in claim 3, wherein each pivoting support comprises two branches that are parallel to one another and positioned on either side of the line and of the floating shut-off device and that are configured to pivot in planes perpendicular to the first pivot axis, each of the branches connecting the line and the floating shut-off device.

5. The tank as claimed in claim 3,
wherein, for each first portion situated in the vicinity of the first end and for each pair comprising an orifice and a floating shut-off device, the first pivot axis of the pivoting support of the floating shut-off device is closer to the first end than the orifice, and
wherein, for each second portion situated in the vicinity of the second end and for each pair comprising an orifice and a floating shut-off device, the first pivot axis of the pivoting support of the floating shut-off device is closer to the second end than the orifice.

6. The tank as claimed in claim 1,
wherein each floating shut-off device is a sphere, and
wherein each orifice is substantially circular.

7. The tank as claimed in claim 1,
wherein the first portion describes a trajectory in a shape of a U having a base oriented toward the first end, and
wherein the second portion describes a trajectory in the shape of a U having a base oriented toward the second end.

8. The tank as claimed in claim 7, wherein each capture device comprises a line comprising, in series, a first part exiting the chamber, the first U-shaped portion positioned in the vicinity of the first end of the chamber, a rectilinear intermediate portion and the second U-shaped portion positioned in the vicinity of the second end.

9. An aircraft comprising at least one tank as claimed in claim 1.

* * * * *